United States Patent Office 3,543,188
Patented Nov. 24, 1970

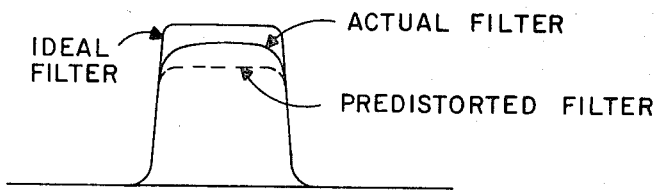
FIG. 1
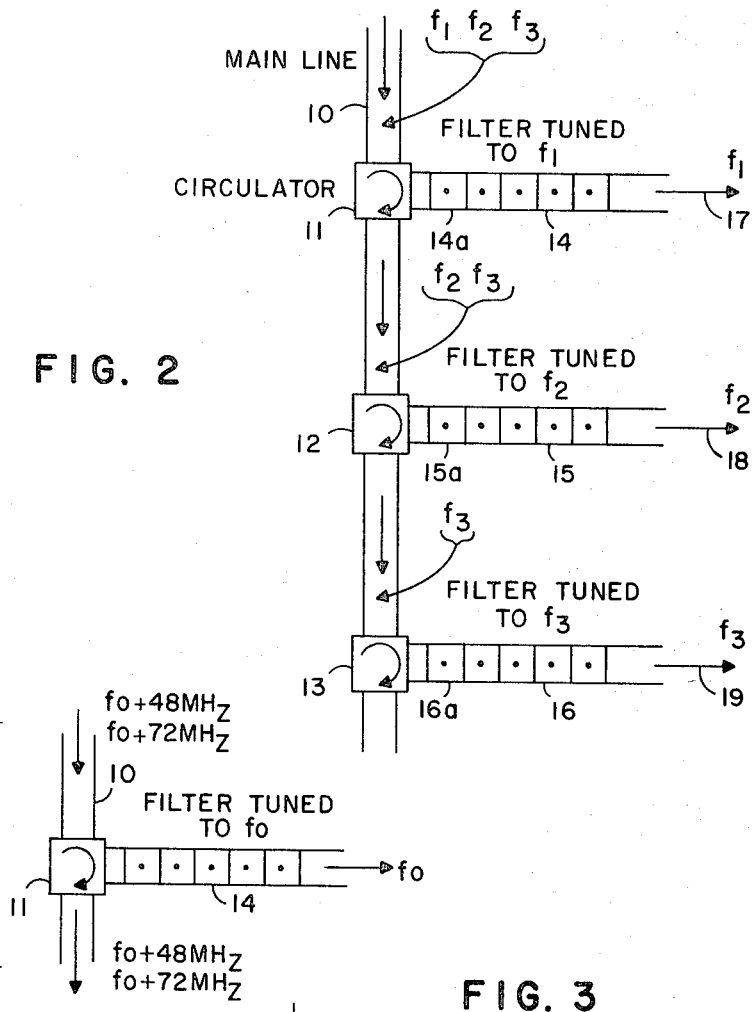
FIG. 2
FIG. 3
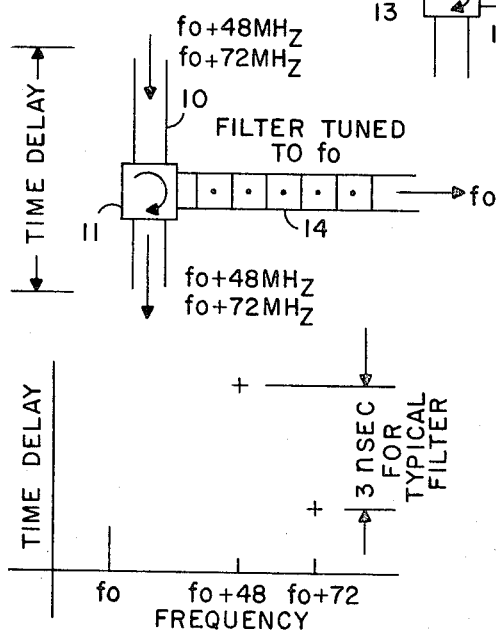
INVENTOR.
ROBERT M. LIVINGSTON
BY *R W Anderson*
AGENT

3,543,188
MICROWAVE DIPLEXING TECHNIQUE EMPLOYING PREDISTORTED WAVEGUIDE FILTERS
Robert M. Livingston, Dallas, Tex., assignor to Collins Radio Company, Dallas, Tex., a corporation of Iowa
Filed Oct. 13, 1969, Ser. No. 865,804
Int. Cl. H01p *5/12;* H03h *7/08*
U.S. Cl. 333—6                                                6 Claims

ABSTRACT OF THE DISCLOSURE

This invention describes a technique of employing predistorted waveguide filters in microwave branching networks wherein a plurality of carrier frequencies are to be separated from a common transmission line or combined for transmission in a common line. By arranging the predistorted microwave filters in the branch filtering network such that the high Q end of the filters is that from which signal reflections occur, a marked improvement in differential time delay of the reflected signals is realized along with a reduction in differential power loss and absolute level of reflected power loss.

---

This invention relates to microwave communication systems filtering techniques and more particularly to a filtering technique employed in microwave diplexing arrangements whereby the distortion due to differential time delays of the diplexed signals may be minimized.

Branch filtering schemes are used in microwave communication systems for the purpose of separating, by selective branch filtering, multiple carrier frequency spectra present on a common line. Thus, for example, a plurality of carrier signals may be transmitted or received on a common antenna. Outputs from multiple transmitters must then be coupled to a common line for transmission and channeled from a common receiving line to multiple receivers. Present branching schemes apply the received or transmitted signal to a series of waveguide filters branching into or from a common line. Each filter selectively passes a particular one of the carrier frequencies and reflects the others. A common means of accomplishing this end employs circulators in branching networks. The filters pass the particular one of the carrier frequencies to which they are tuned and reflect the others through the circulators down the line.

There is a time delay associated with the signals reflected from each of the successive branch filters, and this time delay varies as a function of the proximity of the reflected signals to the center frequency of the branch filter from which it reflects. This introduces a differential time delay which introduces distortion.

It is accordingly an object of the present invention to employ a filtering scheme using predistorted waveguide filters as branch filters in a diplexing arrangement whereby distortion caused by differential time delay is minimized. The present invention is featured in the provision of employing predistorted waveguide filters in a diplexing arrangement in conjunction with circulators whereby signals applied to a filter which fall outside the passband of a particular filter are reflected with a minimum of differential time delay.

These and other features and objects of the present invention will become apparent upon reading the following description in conjunction with the accompanying drawings in which;

FIG. 1 illustrates filter responses of ideal, actual, and predistorted filters;

FIG. 2 is a functional representation of a microwave receiver site diplexing scheme employing circulators and branch filters;

FIG. 3 illustrates a single branch filter and circulator as employed in a system in accordance with FIG. 2 illustrating the effect of the filter on the time delay of reflected signals close to the filter center frequency;

Figure 4:
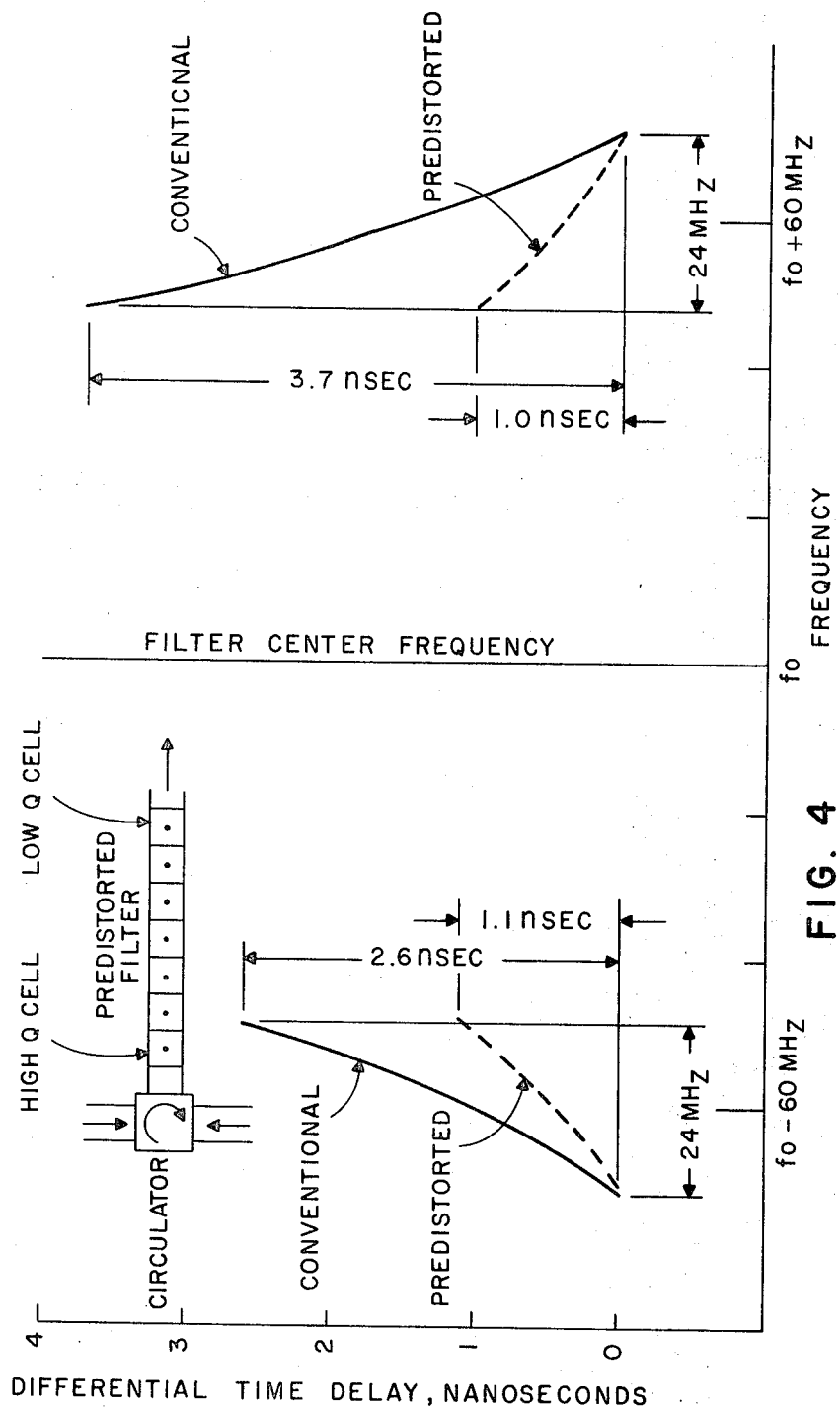
FIG. 4 is a plot of measured time delay of a particular conventional maximally flat waveguide filter as compared to a predistorted waveguide filter.

The present invention in general operation employs predistorted waveguide filters as branch filters in a microwave diplexing arrangement in a manner such that particular characteristics of such filters are employed to a novel advantage in reducing differential time delay of the signals involved.

The use of the predistortion technique for correcting the effects of energy dissipation in electrical filters is a known expedient in the art. This technique as applied to waveguide distributed constant filters is employed in the present invention to realize a decided improvement in microwave diplexing techniques.

Predistortion is a standard technique for correcting the effects of energy dissipation in filters and is a technique employed to make filter responses conform to that of ideal filters. A typical lumped constant filter used in communication systems consists of capacitors and inductors. In the design of these filters it is customarily assumed that the capacitors and inductors are ideal, lossless elements. Actual elements, however, invariably have some loss which changes the desired or ideal response of the filter.

With reference to FIG. 1 the difference between ideal and actual responses of a typical bandpass filter are illustrated. Note that the actual filter has passband edges which slump downward due to dissipation introduced by filter elements which are inherently lossy. Note also that the predistorted filter approaches the ideal filter response characteristic. The deviation of the passband characteristic from the ideal characteristic may introduce serious distortion in some types of signals. Predistortion techniques allow for dissipation in the initial design and a response very closely approximating the ideal response can be realized in an actual filter. The price paid for this response is increased insertion loss. However, in certain application the advantage of an ideal response outweighs the disadvantage of a higher insertion loss, the significance of which will further be discussed.

The present invention employs predistortion techniques as they may be applied to attaining ideal response characteristics in waveguide filters. Since predistortion techniques as applied to waveguide bandpass filter design is a known expedient in the art, a detailed discussion of such techniques will not be included here. It would suffice to state that the predistortion technique generally is based on the effect of element dissipation on an ordinary bandpass filter. If a bandpass filter is designed to be built from lossless elements and is then built from real, slightly lossy elements, a small flat loss is introduced and, secondly, the top and sharp corners of the bandpass are rounded. If then a lossless bandpass filter is designed to be slightly peaked on the two shoulders, and is then built from slightly lossy elements, the rounding effect of the dissipation and the peaked shoulders of the lossless design tend to cancel each other and result in a transmission characteristic which approaches the ideal. The term "predistorted waveguide filter," as used herein, is accordingly defined as a filter designed using predistortion techniques, such techniques being known in the art. The advance in the art to be realized from the present invention may be appreciated by first considering detrimental distortions introduced by differential time delays in multiplex systems when conventional waveguide filters are employed as the branch filters.

Conventional waveguide bandpass filters have responses such as the actual filter response depicted in FIG. 1, that is, a rounding effect on the top of the characteristic and a rounding off of the desired sharp edges. Referring now to FIG. 2 a diplexing scheme as employed in microwave systems is depicted wherein a main input waveguide line 10 is connected to a branching network comprised of circulators 11, 12, and 13 in conjunction with branch passband filters 14, 15, and 16, respectively. The diplexing scheme might depict the separation of three carrier frequencies $f_1$, $f_2$, and $f_3$ present in the main line to branch output channels 17, 18, and 19, respectively, as would be typical at a receiving site. Power coming down the main line 10 is first directed toward filter 14 by circulator 11. The signal at the $f_1$ frequency is passed through filter 14 and other signals are reflected off the input cavity 14a of filter 14 and on down the main line toward the second circulator 12. Frequency $f_2$ is passed through filter 15 and remaining frequency $f_3$ is reflected off the input cavity 15a of filter 15 and on down the line to the further circulator 13 which directs $f_3$ through branch filter 16 to output line 19. It is noted that the general scheme operates on the principle that if the signal applied to a branch filter is at the filter frequency, it passes through; otherwise, it is reflected off the branch filter and directed back down the main line in the direction it was originally going.

This scheme works well with conventional waveguide filters, provided the signals are widely separated in frequency. If, however, the signals $f_1$, $f_2$, and $f_3$ are extremely close in frequency, difficulties arise. A signal reflecting off a branch filter tuned close to its frequency will be distorted by the filter. The differential group delay of the signal will be affected. Group delay represents the time delay encountered by a signal in traveling down a transmission path. A signal close to the center frequency of the filter will be delayed in time, by reflecting off the filter, more than a signal far from the filter center frequency.

For example, in microwave applications one might have two signals 48 mHz and 72 mHz from the filter center frequencies. Using ordinary waveguide filters there will be three nanoseconds of difference in time delay of these signals after being reflected. This situation is depicted graphically in FIG. 3 wherein signals corresponding to $f_0+48$ mHz and $f_0+72$ mHz are applied to a branch filter tuned to $f_0$. The signals $f_0+48$ mHz and $f_0+72$ mHz are reflected off the input cavity of the filter and directed back down the line in the direction they started from. The plot of frequency versus time delay indicates that the difference in the time delay between these two signals from a point prior to application to the branch filter to a point in the main line after application to the branch filter may vary by as much as three nanoseconds for a typical filter. If a frequency modulated signal whose sidebands cover the 24 mHz range between 48 and 72 mHz is reflected off the filter, the resulting differential time delay will cause distortion and degradation in the signal. If this signal contained several hundred telephone conversations which have been multiplexed together, this delay could cause intermodulation and cross-talk.

The waveguide filters used in microwave systems consist of waveguide resonant cavities coupled by waveguide irises. It has been found that the differential time delay referred to herein is inversely proportional to the unloaded Q of the end cavity of the filter from which this signal is reflected such as end cavities 14a, 15a, and 16a in the diplexing scheme of FIG. 2. In microwave systems the bandwidth and number of cells of waveguide filters are already determined, thus fixing the Q of the end cavity. The higher the unloaded Q of the cavity the lower the differential time delay. In predistorted waveguide filters comprised of more than two resonant cavities the filter must be constructed unsymmetrically in order to arrive at the idealized response characteristic. One end of the predistorted waveguide filter has a very high Q cavity, while the other has a very low Q cavity. The high Q cavity has a significantly higher Q than that of a nonpredistorted filter whose end cavities are symmetrical. Thus by arranging the filter such that the signal applied thereto reflects off the high-Q end of the predistorted filter, the differential time delay of the signal is reduced while at the same time the signal passing through the filter has the benefit of the filter's more ideal response. The reflected time delay difference between conventional and predistorted waveguide filters is illustrated in FIG. 4. The improvement realized by predistorted filters is seen to be approximately three to one.

An additional advantage is gained from the filter configuration in that there is a reduced loss of power of the reflected signal from each branch filter. It happens that the loss of power is approximately proportional to the group time delay. Thus reducing the differential group time delay of the reflected signal also reduces the differential power loss and the absolute level of reflected power loss as well.

Figure 5:
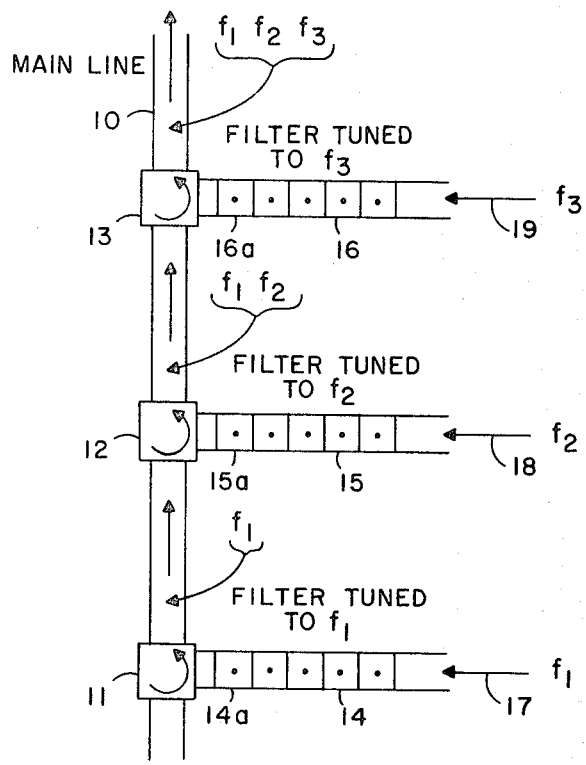
FIG. 5 is a functional diagram of a microwave transmitter site diplexing scheme employing circulators and branch filters.

Discussion herein relating to the system of FIG. 2 has centered about a typical receiving system where several carrier frequencies such as $f_1$, $f_2$, and $f_3$ are received on a common antenna and applied to a main line for separation by branching techniques to receivers. It is to be understood that the branching technique is also utilized at transmitting sites where several transmitters are using a common antenna. In this case the configuration, as depicted functionally in FIG. 5, is essentially that of FIG. 2 with signal flow being reversed and the circulator being reversed. Reflections still occur and the problem of differential time delay is still encountered. The advantages offered by this invention are realized in either case.

The present invention is seen to provide at the slight cost of increased insertion loss a more idealized branch filter characteristic and a dramatic reduction in distortion due to differential time delays of reflected signals in the branching networks.

I claim:

1. Means for coupling energy defined by two carrier frequency signals into a common line and separating first and second carrier frequency signals from a common line to first and second output lines, comprising a waveguide circulator having a first port, a second port, and a third port, said circulator being adapted to transmit energy directed to said first port to said second port and energy directed to said second port to said third port, first and second transmission line sections connected respectively to said first and third ports, a predistorted waveguide filter having at least three resonant cavity sections connected to the second port and having a center frequency tuned to one of said carrier frequencies, said predistorted filter having a predetermined bandwidth and respective end cavities, one having a Q greater and the other having a Q less than those of a conventional nonpredistorted filter of the same bandwidth, said high Q end cavity of said filter being connected to said second port of said circulator, means for coupling energy at a first one of said carrier frequencies to which said filter is tuned, to and from the other end cavity of said waveguide filter, means for coupling energy at both said first and second carrier frequencies from said first and second waveguide sections, whereby signals coupled to the circulator coupled end cavity of said filter are reflected and redirected down said waveguide section with the differential time delay of the reflected signal being minimized.

2. A waveguide branching network by means of which a plurality of carrier frequencies may be combined for transmission in a common line and by means of which a plurality of carrier frequencies being transmitted down a common line may be separated into discrete channels, comprising a plurality of waveguide circulators displaced along said main line, each of said waveguide circulators comprising an input port to which main line energy is directed, an output port from which main line energy is redirected down the line, and a third port, said circulators being adapted to transmit energy applied to the input ports thereof to said third port and to direct energy applied to said third port out of said output port, a plurality of waveguide filters, each of which is individually coupled to the third port of a different one of said circultors, said waveguide filters being comprised of a plurality of resonant sections including first and second end sections and having center frequencies corresponding respectively to different ones of said carrier frequencies, each of said waveguide filters comprising a pre-distorted filter having one end cavity with a Q greater than that of a conventional nonpredistorted filter of the same bandwidth and the other of said end cavities with a Q less than that of a conventional nonpredistorted filter of the same bandwidth, those of said carrier signals applied through said circulators to said filters, the frequencies of which lie outside the bandwidth of said filters being reflected by said circulator for direction down the main line with a minimum differential time delay.

3. Means for combining a plurality of carrier frequencies for transmission down a common transmission line comprising a plurality of wave circulators each having first, second, and third ports, each of said circulators being adapted to direct energy transmitted to the first of said ports to said second port and energy transmitted to the second of said ports to said third port, the first and third ports of each of said circulators connected to one end of a predetermined length of common transmission line, the second port of each of said circulators connected to one of a plurality of waveguide filters, each of said waveguide filters comprising a plurality of resonant sections comprising a predistorted filter having a predetermined bandwidth centered about one of said plurality of carrier frequencies, one of the end cavities of each filter having a Q greater than and the other end cavity having a Q less than that of a conventional nonpredistorted filter of the same bandwidth, and the high Q ones of said end sections connected to the respective second ports of one of said circulators, said plurality of carrier frequencies applied respectively to the other end section of that one of said filters to which it is tuned, whereby the reflected ones of said carrier frequencies and their respective sideband frequency spectra are reflected with a minimal differential time delay.

4. In a microwave diplexing scheme wherein a first carrier frequency is to be separated from a second carrier frequency each of said carrier frequencies being present on a main input line, a circulator having first, second, and third ports, said circulator applying energy received by said first port to said second port and energy received by said second port to said third port, said main input line to the first circulator port, a predistorted waveguide filter having at least three resonant cavity sections connected to the second port of said circulator and having a center frequency tuned to one of said carrier frequencies, and an output taken from the third port of said circulator comprised of the second carrier as reflected from said filter, said predistorted filter having a predetermined bandwidth and respective end cavities one having a Q greater and the other having a Q less than that of a conventional nonpredistorted filter of the same bandwidth, said higher Q end cavity being connected to the second port of said circulator, whereby the differential time delay of the reflected one of said carrier frequencies and its included sideband frequencies is reduced.

5. A diplexing system comprising a plurality of branch filters respective ones of which are respectively tuned to one of a plurality of carrier frequencies being transmitted on a common line, said common line being connected to a first port of a waveguide circulator the second port of which is applied to the input of a first one of said branch filters, an output port of said circulator being connected to the first port of a subsequent circulator, said circulators being adapted to pass energy applied to the first ports thereof to said second ports and the energy applied to said second ports to said output ports, each of said filters being comprised of at least three resonant cavities cascaded in a predistorted waveguide filter assembly whereby said filter includes a first end cavity having a Q substantially greater than that of its second end cavity, each of said filters having said first high Q cavity connected to and receiving the energy from the second port of the associated one of said waveguide circulators, each of said filters passing that one of said plurality of carrier frequencies applied thereto to which it is tuned and reflecting those of said carrier frequencies to which it is not tuned with a minimized differential time delay.

6. In a microwave diplexing scheme of the type employing branch waveguide filters in conjunction with waveguide circulators wherein successive ones of a plurality of carrier frequencies are passed to branch output lines, each of said filters reflecting signal components applied thereto the frequencies of which fall out of the filter passband to a succeeding one of said circulators for application to a further one of said branch filters, means for reducing the differential time delay of the signal components reflected by said branch filters for application to subsequent ones of said filters comprising the employment of predistorted waveguide filters having at least three cascaded resonant cavity sections as said branch filters, each of said predistorted waveguide filters having one end cavity exhibiting a Q substantially greater than the other one of said end cavities and said circulators applying the line energy to the respective high Q end cavities of said predistorted filters.

References Cited

UNITED STATES PATENTS 3,273,064   9/1966   Künemund _____ 333—10 X

OTHER REFERENCES

A Microwave Ferrite Frequency Separator-Rapaport, in IRE Transactions on Microwave Theory and Techniques, volume MTT–6, No. 1, January 1958, pp. 53–58.

HERMAN KARL SAALBACH, Primary Examiner

M. NUSSBAUM, Assistant Examiner

U.S. Cl. X.R.

333—73